Patented Sept. 3, 1946

2,407,061

UNITED STATES PATENT OFFICE 2,407,061

PROCESS OF TREATING POLYVINYL ALCOHOL

Joseph Dahle, West Newton, Mass., assignor, by mesne assignments, to Pro-phy-lac-tic Brush Company, Northampton, Mass., a corporation of Delaware No Drawing. Application April 11, 1941, Serial No. 388,144

3 Claims. (Cl. 18—47.5)

In a companion application filed April 11, 1941, Serial No. 388,143, now U. S. Patent No. 2,360,477, there has been described a generically new method of producing substances, many of which are resin-like. By this method it is possible to make water resistant or even water insoluble resins from such hydroxylic base materials as polyvinyl alcohol, starch, dextrin, etc., etc. The procedure described is essentially topochemical, i. e., the base material does not go into solution during the reaction but remains substantially solid although more or less swelling may take place depending on the particular combination of reagents employed. If under the conditions of the reaction the reaction product would ordinarily be soluble in the reaction mixture, a miscible non-solvent for the reaction product may be added in order to keep the reaction topochemical in character. The present invention is intended to cover the specific application to polyvinyl alcohol of the novel process described in the application just mentioned.

It is part of my discovery that the base material, for instance, polyvinyl alcohol, etc., may be shaped into the final article before subjecting it to the treatment described in my said application. The articles so produced, or the exterior surface thereof, will then have the chemical nature of the corresponding final product described in the prior application. Thus, it is possible to form filaments, tubes, sheets and other shapes or forms from polyvinyl alcohol and then to treat them as described, thereby converting the water-soluble base materials into a water insoluble, resin-like final product which is wholly or in part an acetal.

In an earlier application of Joseph Dahle, Serial No. 343,439, filed July 1, 1940, now U. S. Patent No. 2,327,872, there has been described also the process of treating articles made from materials composed of long chain molecules in such a way as to orient the molecules and thereafter to fix them in their oriented position by chemical reaction. In practicing the invention of the present application the step of orienting the molecules may or may not be practiced according to the characteristics required of the material to be produced.

My present invention is based on two discoveries:

First, that polyvinyl alcohol may be reacted upon by an acetal, preferably in the presence of a catalyst, without converting it into a solution. However, this reaction soon ultimately reaches an equilibrium which is far short of reacting all of the hydroxyl groups and leaves a considerable portion of unreacted hydroxyl groups.

Second, if it is desired to react a higher proportion of the hydroxyl groups this can be accomplished by reacting with an acetal in the presence of an aldehyde, of a catalyst and, if desired, of a water absorbing substance.

The effect of the aldehyde is to convert the by-product alcohol resulting from the first reaction into more of the original acetal thus removing the by-product alcohol from the zone of reaction and shifting the equilibrium in the desired direction. In this secondary reaction between the by-product alcohol and the aldehyde, water is produced and the water absorbing substance is introduced to remove the water from the zone of the reaction and allow the reaction to proceed further. In this way, the original reaction between the polyvinyl alcohol and the acetal can be made to proceed much more nearly to completion.

In the reaction, as I understand it, there are two steps or stages, although the second step proceeds simultaneously with the first.

1. An exchange reaction in which the aldehyde group of the reacting acetal reacts with hydroxyl groups of the polyvinyl alcohol to form a different or resultant acetal, and the remainder of the reacting acetal unites with the hydrogen of the hydroxyl groups of the polyvinyl alcohol to form by-product alcohol.

2. A reaction of the free aldehyde with the by-product alcohol formed in the first stage which would otherwise tend to block the reaction. This second reaction forms more of the original reacting acetal and water. Preferably this water is removed from the reaction zone by some water absorbent substance or by evaporation.

The following examples serve to illustrate the two steps of the reaction.

*First step.* — 44 grams polyvinyl alcohol (screened through 80 mesh and dried) were mixed with 380 grams methyl formal and 3.8 grams sulfuric acid as a catalyst. The mixture was refluxed for 2 hours at 44–46° C. The product, after washing and drying, was analyzed for hydroxyl content and found to have 34.5% expressed as vinyl alcohol. Analysis of the powdered polyvinyl alcohol before the treatment showed it to have 98.5% hydroxyl groups calculated as vinyl alcohol.

The foregoing is given to show the effect of the treatment of polyvinyl alcohol with an acetal in comparison with the effect where an aldehyde is also used to prevent the reaction slowing down and eventually ceasing.

*First and second steps performed simultaneously.* — 44 grams powdered polyvinyl alcohol (screened through 80 mesh and dried) were introduced into the following mixture:

|  | Grams |
|---|---|
| Methyl formal | 304 |
| Paraformaldehyde | 30 |
| Sulfuric acid | 3.5 |

The whole was refluxed for two hours, then washed, dried and analyzed. The product was found to have 7.0% hydroxyl groups calculated as vinyl alcohol.

Thus the hydroxyl content expressed as polyvinyl alcohol was reduced from 98.5% to 34.5% by the first step alone and from 98.5% to 7.0% by the first and second step combined. Throughout the treatment the polyvinyl alcohol remained in the condition of separate particles although there was some swelling. In these two examples the molecular ratio of polyvinyl alcohol to the total formaldehyde, i. e., that in the methyl formal and in the paraformaldehyde, is the same, and the catalyst in each case is approximately one per cent of the weight of the formaldehyde-containing materials.

The foregoing reactions may be represented by the following equations:

*First step*

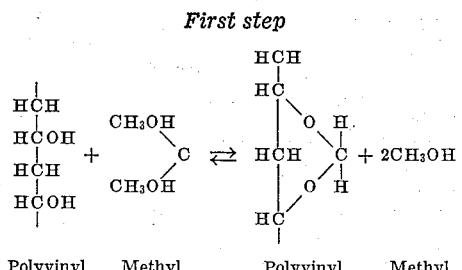

Polyvinyl alcohol   Methyl formal   Polyvinyl acetal   Methyl alcohol

*Second step*

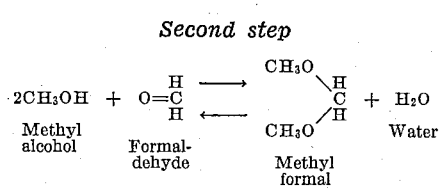

Methyl alcohol   Formaldehyde   Methyl formal   Water

Of course, it will be understood that the first equation above indicates the reaction of only a single molecule of methyl formal with two hydroxyl groups on the same molecular chain of polyvinyl alcohol. In producing polyvinyl acetals hitherto it has been customary to use either polyvinyl alcohol dissolved in water or suspended in a liquid which is a solvent for the resulting polyvinyl acetal; or polyvinyl esters dissolved in a liquid which is a solvent for the polyvinyl acetal. When polyvinyl alcohol dissolved in water is reacted with aldehydes in the presence of a catalyst, polyvinyl acetals containing a large amount of unreacted hydroxyl groups are produced. When the polyvinyl alcohol is suspended in a solvent for the resulting polyvinyl acetal, somewhat higher degrees of reaction are possible by using large excess of aldehyde. When polyvinyl esters are used the final reaction product contains substantial quantities of unreacted hydroxyl groups as well as unhydrolyzed and unreacted ester. By my novel process high degrees of reaction are possible. In addition products having different physical properties are produced although the percentages of unreacted hydroxyl groups may be the same.

Such a product would be indicated by the following formula:

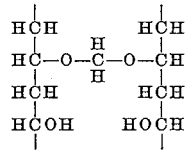

The above formula is given to indicate cross-linkage, but it will be understood that the extent of cross-linkage may vary and that it is not intended to imply that the cross-linkage is complete. It will be understood that the other reactions will be the same as in the first instance cited above.

The reasons for believing that such cross-linkages between molecules does occur when the reaction is carried out under topochemical conditions are that the acetals thus formed are less soluble in solvents than are acetals of corresponding composition formed in solution; and furthermore, the acetals formed under topochemical conditions have higher softening points than acetals of corresponding composition formed in solution, indicating an increase in molecular weight.

In practicing the present invention, I may, for example, react on the polyvinyl alcohol in the form of a granular powder, or may first form filaments, rods, tubes, sheets, containers or other shapes from polyvinyl alcohol, and then react upon the formed article by a non-solid acetal in the presence of an aldehyde and preferably of a catalyst and of a water absorbing substance.

If desired and as already explained, the article may be treated to orient long chain molecules, as explained in the application of Joseph Dahle, already referred to. If the article is a filament, orientation is conveniently accomplished by stretching it. If the article is a sheet it may be stretched in one or more than one direction.

Inasmuch as polyvinyl alcohol is readily soluble in water and is affected by moisture, it has heretofore not been considered to be useful for the manufacture of articles which are intended to be resistant to water or moisture. Since my novel process renders polyvinyl alcohol insoluble in water, my invention makes it possible to use polyvinyl alcohol as a raw or base material for the manufacture of filaments for textiles, bristles, etc., as well as for rods, tubes and sheets; and for various other uses. The moisture and water resistant properties of the articles made in accordance with the present invention are illustrated by the fact that thin sheets made from polyvinyl alcohol by the process described herein may be boiled in water, without dissolving. Tubes may be made which are insoluble in water on the outside and are insoluble in gasoline on the inside.

When made by my present process and treated as described in the said application of Joseph Dahle, the polyvinyl alcohol filaments will be found to retain, even when subjected to water or moisture, some of the increased strength, toughness and elasticity. Such filaments are adapted for use as bristles and as textile fibres.

While I have referred herein particularly to filaments because the invention is advantageous in their manufacture, it may also be used in connection with the manufacture of articles of other shapes, such, for instance, as tubes, rods and sheets. Where the article has small cross-section or has very thin walls, the treatment may convert the entire body of polyvinyl alcohol to a polyvinyl acetal. Where the walls or articles are of substantial thickness, the treatment described may convert only the outer layer or surface of the article into the acetal, the remainder of the mass of the article remaining as polyvinyl alcohol. However, since this unchanged polyvinyl alcohol is completely surrounded by a layer of acetal, it is protected thereby from contact with water or other substances so that in effect the article acquires externally the solubility characteristics of the acetal and behaves from the outside as if it were made completely of acetal. Accordingly, sheets, tubes, containers and other shapes may be made with an insolubilized layer of the converted polyvinyl alcohol on one or both sides, the other side or the interior being of polyvinyl alcohol. It is to be understood, of course, that after treatment the shape of the article may, if desired, be changed by any procedure which does not remove the skin of acetal. The entire surface of the article may be treated as described or only one side or even one part of the surface.

Heretofore, it has not been practical to make thin sheets of polyvinyl alcohol for wrapping and similar purposes where it will be exposed to moisture. Sheets made from polyvinyl alcohol in accordance with my present invention are highly water resistant and have the transparency and brilliance of cellulosic sheets. Tubes and other shapes may be made by similar procedure. Where tubes are made the exterior may be treated in accordance with my present invention in which case the exterior will be impervious to and unaffected by water while the interior is unaffected by gasoline and like materials. If desired, the molecular structure of the tube or other article may be oriented by stretching before treatment and this can conveniently be done either by longitudinal stretching or by controlled inflation.

The reaction herein described is essentially topochemical since the base material, polyvinyl alcohol, although it may swell does not go into solution during the treatment.

It will also be understood that the reacting acetal is different from the resultant acetal. Thus, for example, in the case of polyvinyl alcohol if the reacting acetal is formal, the resultant acetal is the acetal of polyvinyl alcohol and formaldehyde.

The aldehyde which is present in the reaction medium is preferably but not necessarily the aldehyde of the reacting acetal employed. Where two different aldehydes are employed acetals of mixed type result.

In many instances it is desirable to carry out the reaction in the presence of a dehydrating agent such as anhydrous sodium sulfate which will remove water from the zone of the reaction.

While it is usually more convenient to include the aldehyde in the treating bath, I have also found that it is possible to mix aldehyde and, if desired, catalyst directly with the polyvinyl alcohol before converting it into the desired shape, in which case the mixture will be reacted, (1) to form a partial acetal followed by further treatment with a reacting acetal in presence of additional aldehyde or (2) the shaped article may be subjected directly to the action of the reacting acetal in which case the aldehyde in the shaped article will serve in part at least as the aldehyde of the reaction bath.

Accordingly, it will be observed that the base material to be used contains unreacted hydroxyl groups, it being immaterial whether some of the hydroxyl groups have been reacted previously, as long as unreacted hydroxyl groups are still present. For example, instead of starting with unreacted polyvinyl alcohol, I may use a partial polyvinyl acetal or a partially hydrolyzed polyvinyl acetate which contain some unreacted hydroxyl groups.

The following are examples of typical reactions:

*Example No. 1.*—Fifty grams of powdered, dried polyvinyl alcohol was refluxed while stirring in a bath consisting of:

| | Grams |
|---|---|
| Methyl formal | 360 |
| Paraformaldehyde | 40 |
| Ethyl sulfuric acid | 4 |
| Sodium sulfate anhydrous | 50 |

After approximately sixteen hours of refluxing, during which time the polyvinyl alcohol grains seemed to swell somewhat but always remained as individual particles, the reaction was discontinued and the reaction product washed with dilute ammonia in water-methanol, followed by several alkaline water washes to remove traces of the catalyst; after several further water washes the sample was dried. A white powder very much like the original polyvinyl alcohol was obtained. However, it was not soluble in water, not even after boiling for several hours. The powder was also insoluble in the common solvents for polyvinyl acetals such as 60% aqueous acetic acid, ethylene dichloride-methanol (80-20 by volume) and 1.4-dioxan. Its hydroxyl content was found to be 14.0% calculated as vinyl alcohol. The original polyvinyl alcohol analyzed by the same method showed 98.5% hydroxyl groups, calculated as vinyl alcohol. The resin without plasticizer could be molded at high temperatures, approximately 180° C. under pressure of 500–1000 lbs. per square inch.

*Example No. 2.*—About twenty grams of the product from Example No. 1 was placed in a bath consisting of:

| | Grams |
|---|---|
| Methyl formal | 180 |
| Paraformaldehyde | 20 |
| Ethyl sulfuric acid | 2 |
| Sodium sulfate, anhydrous | 20 |

It was refluxed for twelve hours. Some of the methyl formal was lost during this period so that an almost dry mixture remained. This was removed from the flask and dried in air for four hours, followed by oven drying at 70° C. overnight. Some discoloration occurred during this time.

The product was washed once in faintly alkaline water, followed by six washes with distilled water containing up to 10% methanol. Drying at 75° C. in an oven overnight followed. This material analyzed only 2.5% hydroxyl groups calculated as vinyl alcohol. Thus, the reaction was practically 98% complete. The product was a very tough resin which did not soften below 190° C.

*Example No. 3.*—A mixture was made containing ethylene-glycol formal, 780 grams; paraformaldehyde, 198 grams; ethyl sulfuric acid, 9.5 grams; and anhydrous sodium sulfate, 78 grams. To insure homogeneity it was stirred and refluxed for a few minutes. Powdered polyvinyl alcohol 60 grams, was heated dry in a flask to attain the refluxing temperature of the bath, 72° C. Then the hot liquid mixture was poured over the polyvinyl alcohol under vigorous mixing.

A sample taken after standing eight minutes was washed and dried. Upon analysis, it showed 16.2% hydroxyl groups calculated as vinyl alcohol.

*Example No. 4.*—Powdered polyvinyl alcohol, 22 grams; glycerol formal, 208 grams; paraformaldehyde, 15 grams; and ethyl sulfuric acid, 2.2 grams, were heated on a water bath for 100 minutes. At this point a stiff elastic gel had formed. It was cut into small pieces and washed in water, and when dried was a white horny substance. When analyzed it was found to have 12.6% hydroxyl groups calculated as vinyl alcohol. It was found insoluble even upon heating in 1.4-dioxan, and in a solvent mixture of ethylene dichloride 80 parts and methanol 20 parts, although it swelled substantially. Commercial polyvinyl formal dissolved in either solvent almost instantly.

*Example No. 5.*—Thin sheets of water-soluble polyvinyl alcohol wrapped on glass cylinders were treated in a bath containing methyl formal 180 parts; paraformaldehyde 20 parts; ethyl sulfuric acid 2 parts. In some cases, 20 parts of a dehydrating agent (anhydrous sodium sulfate) was used; in others it was omitted. The sheets swelled but retained their shape. The reaction was carried out at room temperature for eighteen hours without stirring. The sheets were then removed from the cylinders and air-dried for a short time, then tested for insolubility in boiling water which had been made faintly alkaline to neutralize the acid catalyst. After seven hours of continuous boiling in water none of the samples showed signs of dissolving.

When no dehydrating agent had been used the sheet was fairly soft; when dehydrating agents had been used the sheets were harder. Where the sheet had been in direct contact with the dehydrating agent it was distinctly harder than where it had not.

*Example No. 6.*—Yarn, made by extrusion from polyvinyl alcohol 100 parts, and paraldehyde, 25 parts, and subsequently stretched on drying, was refluxed for 3 hours on a reel in a bath composed of:

| | Grams |
|---|---|
| Methyl formal | 90 |
| Paraformaldehyde | 7 |
| Methanol | 2 |
| Ethyl sulfuric acid | 1 |

After removal from the bath, the yarn was heated at 60° C., in an atmosphere of an inert gas (carbon dioxide) for 4 hours. To remove excess acid it was then refluxed in methyl formal vapor for 3 hours, followed by drying at 100° C. for 2 hours.

This yarn was insoluble in water even after 1 hour's boiling. It had a fair tensile strength. After 5 minutes' boiling it showed 15% shrinkage. No further shrinkage was found after one hour's boiling.

Where, in the foregoing examples, the catalyst is referred to, for convenience, as ethyl sulfuric acid I mean an equimolecular mixture of sulfuric acid and diethyl sulfate. The mixture was usually prepared and allowed to stand at room temperature for at least 24 hours before use. I have not attempted to ascertain to what extent, if any, ethyl sulfuric acid is actually formed. The mixture is advantageous as a catalyst because it stimulates the reactions which constitute both the first and second steps of the process. I have also used hydrochloric acid in reactions at room temperature but less successfully in reactions at higher temperatures because of the production of unstable by-products. Ammonium chloride, ammonium sulfate, and sulfuric acid and probably other catalysts may be employed.

The polyvinyl alcohol employed as a base material is dry but not completely anhydrous and I believe that the small amount of moisture which it contains is advantageous. It will also be observed that the water is preferably removed from the zone of the reaction as fast as it is formed. The phrase "essentially anhydrous" appearing in the claims is not intended to exclude moisture or water present under these conditions. In the appended claims, the phrase "polyvinyl compound containing unreacted hydroxyl groups" is intended to include as equivalents any polyvinyl compound of this character, such as polyvinyl alcohol, partially or incompletely hydrolyzed polyvinyl esters and partial polyvinyl acetal.

I claim:

1. The process of manufacturing shaped articles, such as filaments, rods, tubes, sheets, containers and the like which comprises reacting a monomeric acetal of a mono-aldehyde with a solid polyvinyl base material containing

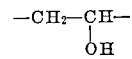

groups in the polymeric chain which can react with the monomeric acetal to form a by-product alcohol, the reaction being conducted under anhydrous conditions in the presence of a catalyst and an aldehyde thereby producing a solid polyvinyl product containing acetal groups, the base material and the acetal resulting from the reaction being in the solid state throughout the process, the monomeric acetal being preformed and in amount at least about 3.9 times the amount of aldehyde.

2. The process of manufacturing shaped articles, such as filaments, rods, tubes, sheets, containers and the like which comprises reacting a monomeric acetal of a mono-aldehyde with a solid polyvinyl base material containing

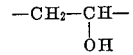

groups in the polymeric chain, the reaction being conducted under anhydrous conditions in the presence of a catalyst and paraformaldehyde and the final product being essentially a polymeric acetal containing unreacted hydroxyl groups of the base material, the base material and the polymeric acetal resulting from the reaction being in the solid state throughout the process, the monomeric acetal being preformed and in amount at least about 3.9 times the amount of aldehyde.

3. The process which comprises reacting a monomeric acetal of a mono-aldehyde with a solid polyvinyl base material containing

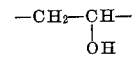

groups in the polymeric chain, the reaction being conducted under anhydrous conditions in the presence of a catalyst and an aldehyde and the final product being essentially a polyvinyl acetal containing unreacted hydroxyl groups of the base material, the base material and the polyvinyl acetal resulting from the reaction being in the solid state throughout the process, the monomeric acetal being preformed and in amount at least about 3.9 times the amount of aldehyde.

JOSEPH DAHLE.